United States Patent
Senoo et al.

(10) Patent No.: US 7,089,337 B2
(45) Date of Patent: Aug. 8, 2006

(54) CONTROLLING DEVICE CONNECTED TO IEEE1394 SERIAL BUS

(75) Inventors: Junya Senoo, Daito (JP); Takeshi Nakata, Daito (JP)

(73) Assignee: Funai Electric Co., Ltd., Daito (JP)

(*) Notice: Subject to any disclaimer, the term of this patent is extended or adjusted under 35 U.S.C. 154(b) by 350 days.

(21) Appl. No.: 10/767,254

(22) Filed: Jan. 30, 2004

(65) Prior Publication Data
US 2004/0186593 A1 Sep. 23, 2004

(30) Foreign Application Priority Data
Jan. 31, 2003 (JP) ............................. 2003-023560

(51) Int. Cl.
*G06F 13/12* (2006.01)
*G06F 3/00* (2006.01)

(52) U.S. Cl. .......................................... 710/62; 710/19
(58) Field of Classification Search .................... None
See application file for complete search history.

(56) References Cited

U.S. PATENT DOCUMENTS
4,731,677 A * 3/1988 Mino et al. .................... 360/60
6,727,799 B1 * 4/2004 Sato et al. .................... 340/3.1

FOREIGN PATENT DOCUMENTS
JP 2001-251325 9/2001

* cited by examiner

*Primary Examiner*—Fritz Fleming
*Assistant Examiner*—Richard B. Franklin, Jr.
(74) *Attorney, Agent, or Firm*—Crowell & Moring LLP (57) ABSTRACT

In the case where a rewind or fast-forward button is clicked after a playback button is clicked, a CPU on controller side sets a reproduction flag bit to "on" upon receipt of a response frame from a DV camcorder indicating that the playback command is normally accepted, without checking whether the DV camcorder is during playback operation or not, and determines what kind of control command should be sent to the DV camcorder based on the reproduction flag bit and the clicked button. The controller can determine the control command without waiting for the response to an inquiry about whether the DV camcorder is during playback operation or not, thus quickly sending a rewind playback or fast-forward playback command to the DV camcorder.

4 Claims, 6 Drawing Sheets

CONTROLLING DEVICE CONNECTED TO IEEE1394 SERIAL BUS

BACKGROUND OF THE INVENTION

1. Field of the Invention

The present invention relates to a controlling device connected to an information reproduction apparatus via an IEEE 1394 serial bus for remote control of the information reproduction apparatus, and to a home network in which the controlling device and the information reproduction apparatus are connected via the IEEE1394 serial bus.

2. Description of the Related Art

Controlling devices are known that control an information reproduction apparatus (hereinafter referred to as a reproducer) such as, for example, a digital VTR (Video Tape Recorder) via the IEEE1394 serial bus (abbreviated as the bus, hereinafter). In such a conventional device, there are cases where a control command cannot be sent to the reproducer until the status of the reproducer is checked. That is because, when a rewind or fast-forward key is pressed, the controlling device should send to the reproducer a rewind or fast-forward command if the reproducer is at a stop, and a rewind playback or fast-forward playback command if the apparatus is during playback operation.

Figure 5:
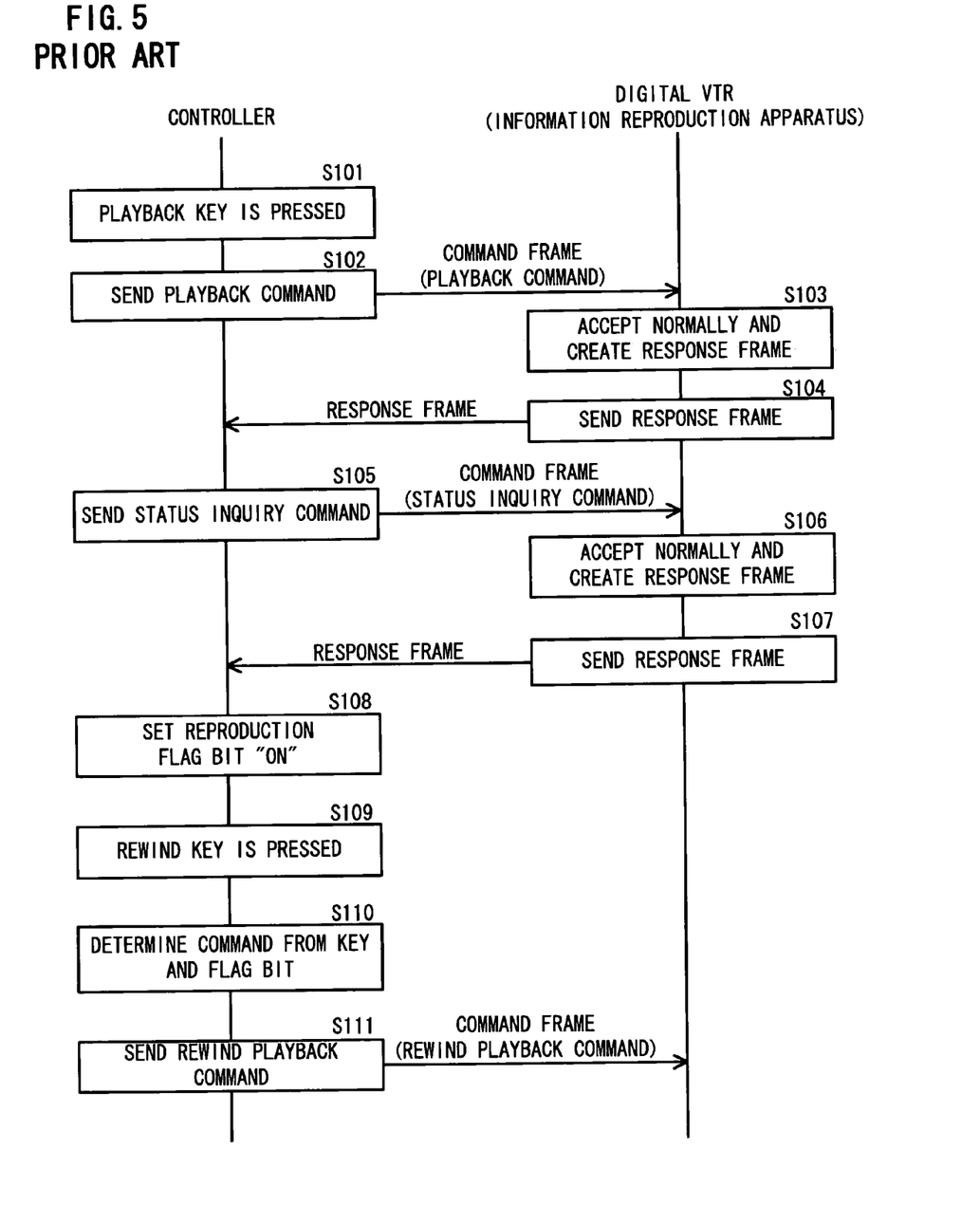
FIG. 5 shows the steps performed on the conventional controlling device side and the reproducer sides in the case where the playback and the rewind keys are pressed in succession in the conventional controlling device.

Referring now to FIG. 5, a description will be made as to the steps performed in the case where a playback key is pressed and then the rewind key is pressed on the controlling device side. When the playback key is pressed (S101), the controlling device sends to the reproducer an Audio Video/Control (AV/C) command frame, which is a Function Control Protocol (FCP) packet frame to be sent from controller side to target side, containing a playback command (S102). When receiving the command frame and normally accepting the playback command, the reproducer creates an AV/C response frame, which is an FCP packet frame to be sent from target side to controller side, to the playback command (S103) and then sends the response frame to the controlling device (S104). Upon receipt of the response frame, the controlling device sends an AV/C command frame containing a status inquiry command to the reproducer (S105). When normally accepting the status inquiry command, the reproducer creates an AV/C response frame to the status inquiry command (S106), and then sends the response frame to the controlling device (S107). After checking the response frame to verify that the reproducer is during playback operation, the controlling device sets a reproduction flag bit (see the item denoted by reference number 18 in FIG. 1) in a RAM "on" (S108). When the rewind key is pressed in this state (S109), the controlling device determines what kind of command should be sent to the reproducer based on the pressed key and the reproduction flag bit in the RAM (S110) and sends a command frame containing a rewind playback command to the reproducer (S111).

Figure 6:
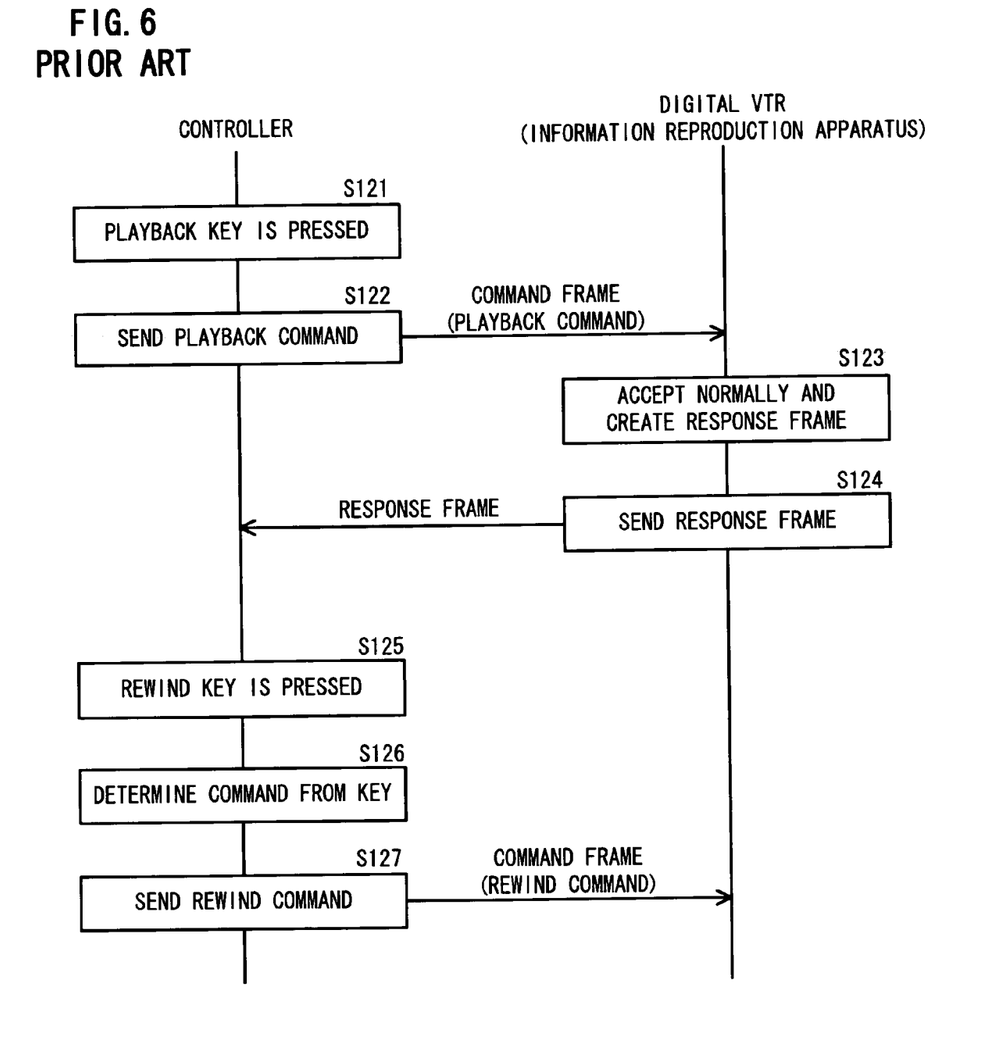
FIG. 6 shows the steps performed on the conventional controlling device side and the reproducer sides in the case where the steps S105–S108 in FIG. 5 are omitted.

However, in the above described controlling device, which, in response to the depression of the rewind or fast-forward key following the depression of the playback key, checks that the reproducer is during playback operation before the determination of the control command to be sent, it is necessary to wait for the response to the inquiry as to whether the reproducer is during playback operation or not. As a result, the controlling device cannot quickly send the rewind playback or fast-forward playback command to the reproducer. In order to prevent the above delay when the playback key and the rewind key are pressed in succession, if, as shown in FIG. 6, the steps corresponding to S105 to S108 in FIG. 5 are omitted such that the controlling device determines the control command to be sent depending only on the most recently pressed key without checking whether or not the reproducer is during playback operation (S126), not the rewind playback command but a rewind command may be sent by mistake (S127).

SUMMARY OF THE INVENTION

An object of the present invention is to provide a controlling device capable of quickly sending a rewind playback or fast-forward playback command to an reproducer when a rewind or fast-forward key is pressed following the press of a playback key, and a home network using the above controlling device.

An aspect of the present invention provides a controlling device connected to an reproducer via an IEEE1394 serial bus, comprising an input device for entry of various operation commands for operating the reproducer, a memory for memorizing status data regarding the reproducer, an IEEE1394 digital interface board for sending control commands corresponding to the operation commands entered using the input device to the reproducer via the IEEE1394 serial bus and receiving responses to the control commands from the reproducer, and a processor for controlling the input device, the memory, and the IEEE1394 digital interface board.

When an operation command is entered using the input device, the processor determines what kind of control command should be sent to the reproducer based on the entered operation command and the status data memorized in the memory and controls the IEEE1394 digital interface board to send the control command according to the determination to the reproducer.

Further, when first and second operation commands are entered in succession using the input device, the processor updates the status data memorized in the memory on receipt of a response, from the reproducer, indicating that a control command corresponding to the first operation command is normally accepted, without checking status of the reproducer, and determines what kind of control command should be sent to the reproducer in response to the second operation command, on entering the second operation command using the input device.

By such a configuration, when two operation commands are entered in succession using the input device, the processor determines the control command to be sent to the reproducer based on the status data and the operation command entered using the input device, without checking the status of the reproducer. This allows the controlling device to determine the control command to be sent to the reproducer without waiting for a response, from the reproducer, to an inquiry about the status thereof. Thus, the controlling device can quickly send a control command to the reproducer for quickly controlling the reproducer.

Preferably, the status data memorized in the memory is data about whether or not the reproducer is during playback operation, and when a playback operation command is entered using the input device, the processor causes the IEEE1394 digital interface board to send a playback control command to the reproducer and updates the status data memorized in the memory on receipt of a response, indicating that the playback control command is normally accepted, from the reproducer via the IEEE1394 digital interface board, without checking whether or not the reproducer is during playback operation, and when either a rewind command or a fast-forward command is entered using the input device following the entry of the playback command, the processor determines what kind of control command should be sent to the reproducer based on the entered operation command and the status data memorized in the memory, without sending to the reproducer a control command for inquiry about whether or not the reproducer is during playback operation.

Such a configuration can eliminate the necessity for the processor to wait for the response to the inquiry about whether or not the reproducer is during playback operation in order to determine the control command to be sent to the reproducer. Therefore, the controlling device can quickly send a rewind playback or fast-forward playback command to the reproducer.

Another aspect of the present invention provides a home network comprising the above controlling device and the reproducer, wherein the controlling device and the reproducer are connected via an IEEE1394 serial bus.

By such a configuration, the controlling device can control the reproducer quickly.

DETAILED DESCRIPTION OF THE PREFERRED EMBODIMENT

Figure 1:
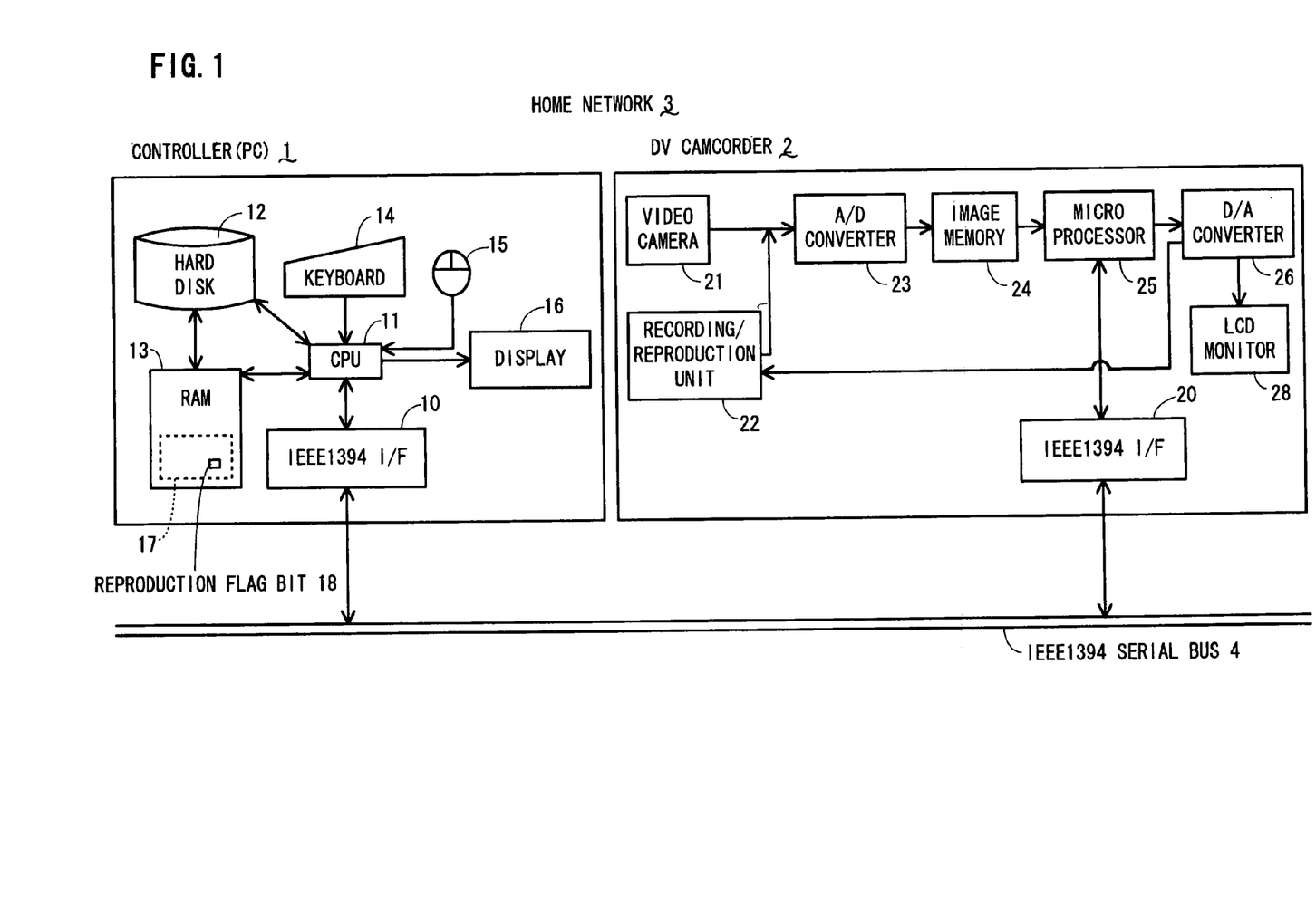
FIG. 1 is a schematic block diagram of a controller according to an embodiment of the present invention and a DV camcorder that is controlled by the controller.

Referring now to the accompanying drawings, a controlling device embodying the present invention and a home network using the same controlling device will be described. FIG. 1 schematically shows the configuration of the home network according to this embodiment. The home network 3 includes the controlling device 1 (hereinafter referred to as a controller), which is a personal computer (PC), and a digital video camera recorder 2 (hereinafter abbreviated as a DV camcorder), which is an information reproduction apparatus to be controlled by the controller 1. The controller 1 and the DV camcorder 2 is connected via an IEEE1394 serial bus 4 (hereinafter abbreviated as a bus).

The controller 1 has an IEEE1394 digital interface board (hereinafter referred to as an IEEE1394 I/F) 10 for sending data such as, for example, a control command to the DV camcorder 2 via the bus 4, a CPU 11 (a processor in claims) for controlling each component of the controller 1, a hard disk 12 in which data including a driver software for the DV camcorder 2 is stored, a RAM 13 (a memory) into which the driver software for the DV camcorder 2 and other various programs are loaded, a keyboard 14 and a mouse 15 (an input device) for a user to enter various commands, and a display 16 on which a control menu for the DV camcorder 2, for example, is displayed. When the controller 1 starts up, the CPU 11 allocates working storage 17 for various programs on the RAM 13. Data in the working storage 17 includes a reproduction flag bit 18 (status data in claims) that is set to "1" (on) if the DV camcorder 2 is during playback operation, and to "0" (off) otherwise.

The DV camcorder 2 has an IEEE1394 I/F 20 for receiving the control command or other data from the controller 1 via the bus 4, a video camera 21 that outputs the image of an object captured with a built-in charge coupled device (CCD) in the form of an analog signal, an A/D converter 23 for converting the analog signal outputted from the video camera 21 into a digital signal, an image memory 24 for storing temporarily the image data in the form of a digital signal transferred from the A/D converter 23, a micro processor 25 for executing various image processing on the image data memorized in the image memory 24, and a D/A converter 26 for converting the image data in the form of a digital signal, which was processed by the micro processor 25, into an analog signal. In addition, the DV camcorder 2 has a recording/reproduction unit 22 for recording on a video tape the image data in the form of the analog signal outputted from the D/A converter 26 and reproducing the image data recorded on the video tape, and a liquid-crystal display (LCD) monitor 28 on which the image outputted from the D/A converter 26 is displayed.

Figure 2:
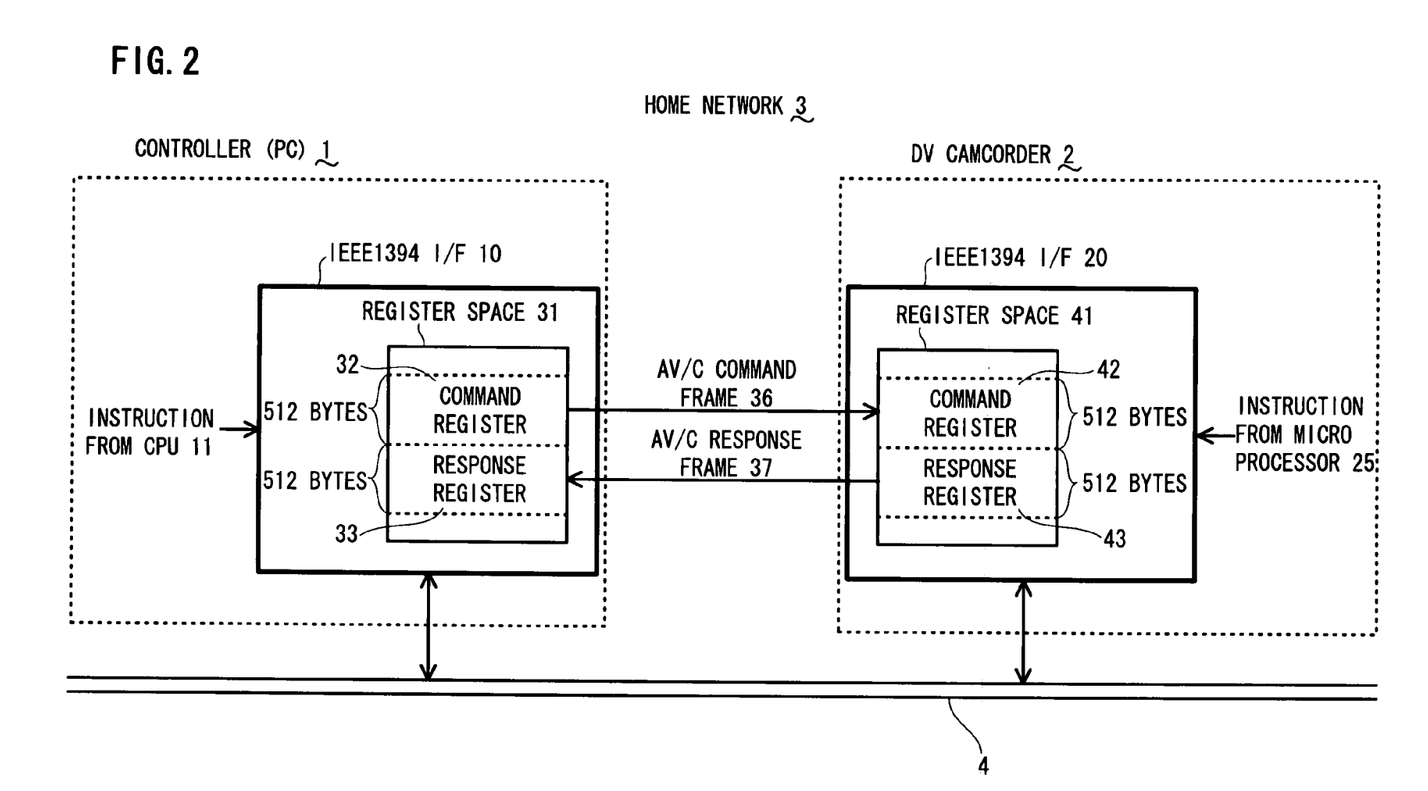
FIG. 2 is a schematic diagram for explaining how the controller controls the DV camcorder.

Referring now to FIG. 2, a description will be made as to how the controller 1 controls the DV camcorder 2. The controller 1 remotely controls the DV camcorder 2 by sending a control command to the DV camcorder 2 via the bus 4. The sending of the control command from the controller 1 to the DV camcorder 2 is carried out using the AV/C protocol that is a data transmission control procedure for use in, for example, transmission of audio and/or video data between electronic equipment in the IEEE1394 standard. The control command (AV/C command) and a response thereto (AV/C response) that are used in the AV/C protocol are sent and received using a packet frame in Function Control Protocol (FCP) format. As shown in FIG. 2, the IEEE1394 I/F 10 on the controller 1 side has a register space 31 in which various control data are stored. The register space 31 includes a command register 32 for temporarily storing an FCP packet frame containing the AV/C command, which is referred to as an AV/C command frame 36 hereinafter, and a response register 33 for temporarily storing an FCP packet frame containing the AV/C response, which is referred to as an AV/C response frame 37 hereinafter. The area size of the register 32 or 33 is 512 bytes, which is the same as that of the FCP packet frame.

The IEEE1394 I/F 20 on the DV camcorder 2 side also has a register space 41 in which various control data are stored. The register space 41 includes a command register 42 and a response register 43, which are equivalent to the above-described registers 32 and 33 respectively.

In the above configuration, the controller 1 controls the DV camcorder 2 in the following manner. First, the CPU 11 of the controller 1 creates an AV/C command frame 36 containing an appropriate AV/C command and stores it in the command register 32. Then, the CPU 11 causes the IEEE1394 I/F 10 to send the AV/C command frame 36 stored in the command register 32 to the DV camcorder 2. Upon receipt of the AV/C command frame 36 via the bus 4, the IEEE1394 I/F 20 of the DV camcorder 2 stores the AV/C command frame 36 in the command register 42 on the DV camcorder 2 side. When detecting a signal from the IEEE1394 I/F 20 indicating that the AV/C command frame 36 is stored, the micro processor 25 of the DV camcorder 2 executes processing in accordance with the AV/C command contained in the AV/C command frame 36 while the micro processor 25 creats the AV/C response frame 37 containing a response to the AV/C command frame 36, and stores the AV/C response frame 37 in the response register 43. Then, the micro processor 25 causes the IEEE1394 I/F 20 to send the AV/C response frame 37 stored in the response register 43 to the controller 1. Upon receipt of the AV/C response frame 37 via the bus 4, the IEEE1394 I/F 10 of the controller 1 stores the AV/C response frame 37 in the response register 33 on the controller 1 side.

Figure 3:
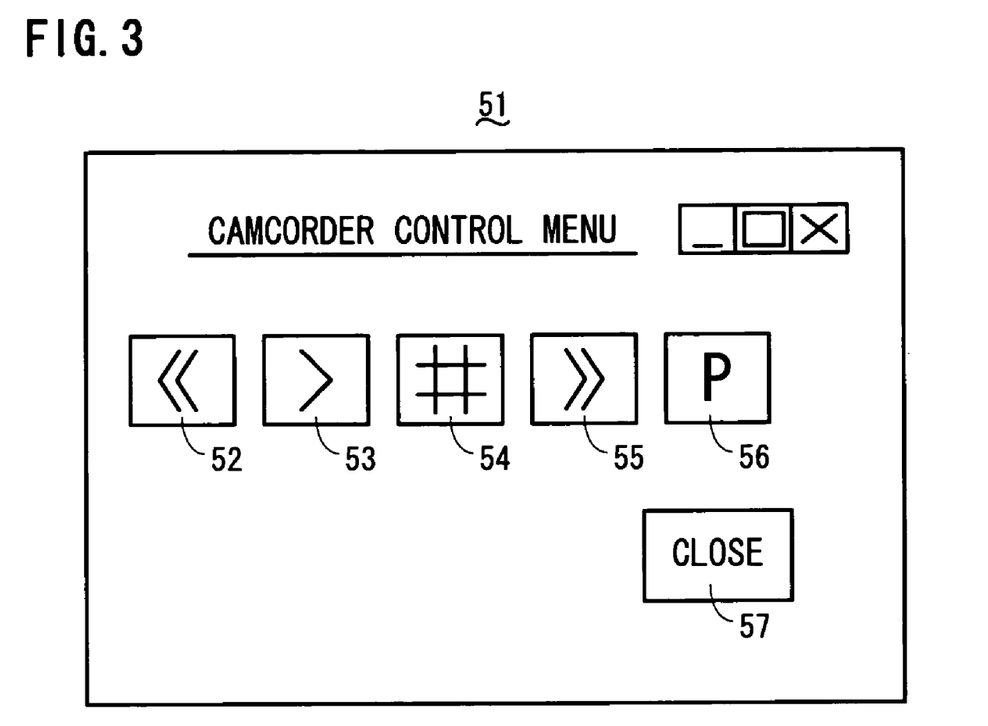
FIG. 3 shows a camcorder control menu for use in the control of the DV camcorder by the controller.

FIG. 3 illustrates a camcorder control menu for use in operation of the DV camcorder 2 by the controller 1. Provided on this camcorder control menu 51 are a rewind button 52 corresponding to a rewind command, a playback button 53 corresponding to a playback command, a stop button 54 corresponding to a stop command, a fast-forward button 55 corresponding to a fast-forward command, a pause button 56 corresponding to a pause command, and a window close button 57 for closing the camcorder control menu 51. When operating the DV camcorder 2 via the controller 1, a user directs the controller 1 to display the camcorder control menu 51 on the display 16 and clicks on desired one of the buttons 52 to 56 on the camcorder control menu 51 using a mouse 15. Then, the CPU 11 of the controller 1 edits an AV/C command frame 36 (see FIG. 2) containing the control command corresponding to the button clicked using the mouse 15 and sends the AV/C command frame 36 to the DV camcorder 2 for control of the DV camcorder 2.

Figure 4:
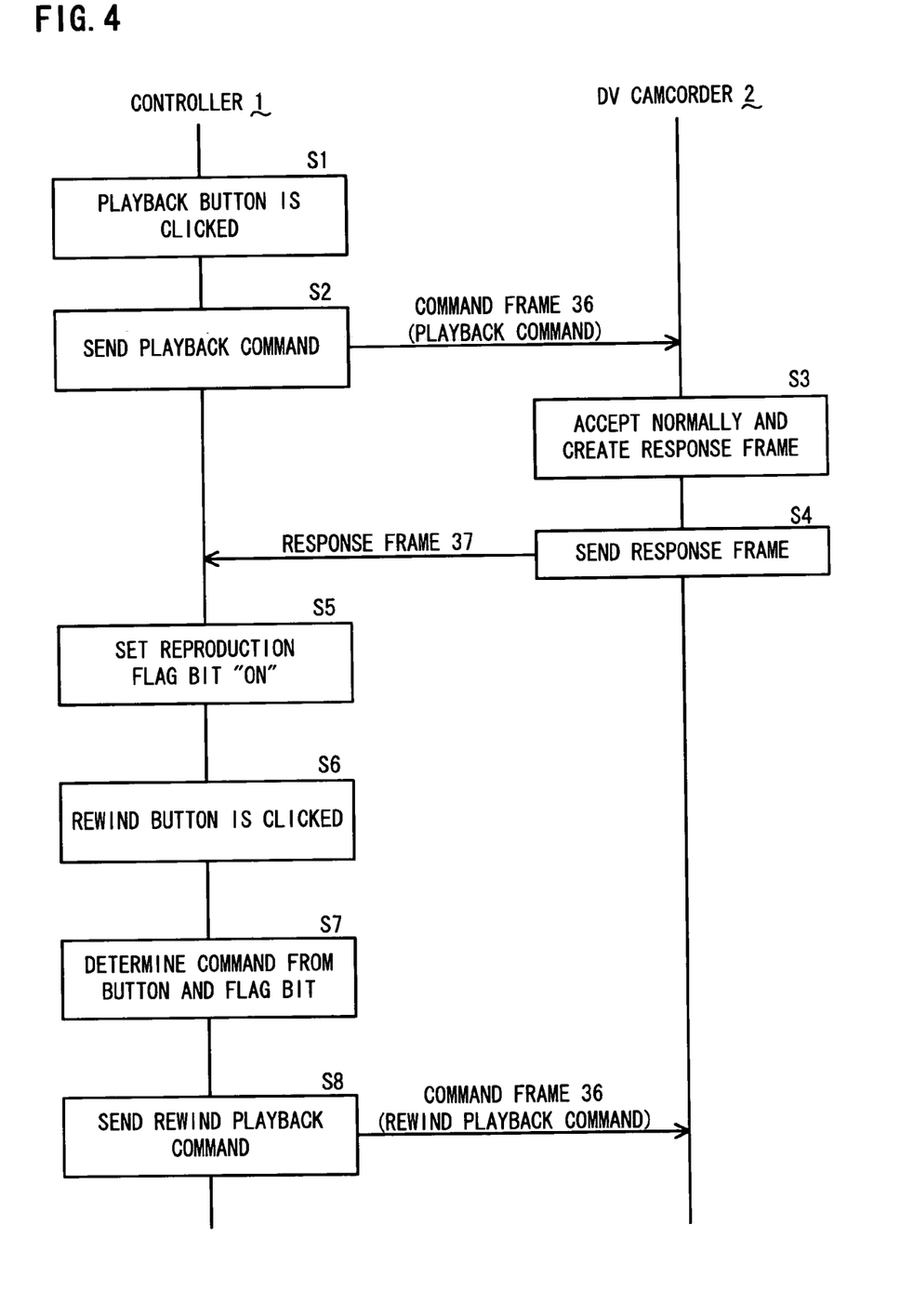
FIG. 4 shows the steps performed on the controller side and the DV camcorder sides in the case where, on the camcorder control menu, a playback button and a rewind button are clicked in succession.

Referring now to FIG. 4, a description will be made as to the steps performed in the case where the playback button 53 and the rewind button 52 on the camcorder control menu 51 are clicked in succession. When the playback button 53 is clicked (S1), the CPU 11 of the controller 1 creates an AV/C command frame (hereinafter, abbreviated as a command frame) 36 containing the playback command and causes the IEEE1394 I/F 10 to send the command frame 36 to the DV camcorder 2 (S2). Upon receipt of the command frame 36, the micro processor 25 of the DV camcorder 2 creates an AV/C response frame (hereinafter, abbreviated as a response frame) 37 corresponding to the playback command (S3), and causes the IEEE1394 I/F 20 to send the response frame 37 to the controller 1 (S4). Upon receipt of the response frame 37 via the IEEE1394 I/F 10, the CPU 11 of the controller 1 checks the response frame to verify that the controlled apparatus, i.e., the DV camcorder 2, has normally accepted the playback command. If the playback command has been normally accepted, the CPU 11 sets the reproduction flag bit 18 in the RAM 13 (see FIG. 1) "on" (S5). When the rewind button 52 (see FIG. 3) is clicked in this state (S6), the CPU 11 of the controller 1 concludes from the clicked button and the state of the reproduction flag bit 18 that the control command which should be sent to the DV camcorder 2 is a rewind playback command (S7). Thus, the CPU 11 causes the IEEE1394 I/F 10 to send to the DV camcorder 2 a command frame 36 containing the rewind playback command (S8).

As described above, in the case where the rewind button 52 is clicked following the click of the playback button 53, the CPU 11 of the controller 1 according to this embodiment updates the reproduction flag bit 18 upon receipt of the response frame 37, from the DV camcorder 2, indicating that the playback command is "accepted", without sending a status inquiry command to the DV camcorder 2 for checking whether the DV camcorder 2 is during playback operation or not, and then the CPU 11 determines what kind of control command should be sent to the DV camcorder 2 in response to the click of the rewind button 52. In other words, the controller 1 according to this embodiment can determine the control command to be sent without waiting for the response, from the DV camcorder 2, to the inquiry about whether the DV camcorder 2 is during playback operation or not. As a result, the controller 1 can quickly send the rewind playback command to the DV camcorder 2.

The present invention is not to be limited by the above described embodiment, but various modifications may be made without departing from the spirit and scope of the invention. For example, in the case where the fast-forward button is clicked after the playback button is clicked, the same steps are performed as the steps in the above embodiment where the rewind button 52 is clicked after the playback button 53 is clicked. More particularly, the controller updates the reproduction flag bit upon receipt of a response frame indicating that the playback command is normally accepted, without making an inquiry about whether or not the DV camcorder is during playback operation, and then determines what kind of control command should be sent to the DV camcorder in response to the click of the fast-forward button. Thus, the controller can quickly send a fast-forward playback command to the DV camcorder. Further, in the above embodiment, the reproduction flag bit 18, which is set to "on" when the DV camcorder 2 is during playback operation, is provided for storing information about the status of the DV camcorder 2, so that the control command to be sent to the DV camcorder 2 is determined based on the reproduction flag bit 18 and the button clicked. The reproduction flag bit may be replaced with a stop flag bit that is set "on" when the DV camcorder is at a stop, so that the control command to be sent to the DV camcorder is determined based on the stop flag bit and the button clicked.

Further, in the above embodiment, when a user clicks one of the buttons 52 to 56 on the camcorder control menu 51 that correspond to different control commands with the mouse 15, the CPU 11 of the controller 1 sends the control command corresponding to the clicked button to the DV camcorder 2. Instead of this method, the depression of one of keys in the keyboard that correspond to different control commands may cause the controller to send the control command corresponding to the depressed button. Still further, the information reproduction apparatus to be controlled by the controller is not limited to the DV camcorder 2 but may be, for example, a digital video tape player/recorder that is separate from a camera, an analog video tape player/recorder, a Digital Versatile Disc (DVD) player/recorder, or an audio tape player/recorder.

What is claimed is:

1. A controlling device connected to an IEEE1394 serial bus, the IEEE1394 serial bus connecting between the controlling device and an information reproduction apparatus, the controlling device comprising:

an input device for entry of various operation commands for operating the information reproduction apparatus;

a memory for memorizing status data regarding the information reproduction apparatus;

an IEEE1394 digital interface board for sending control commands corresponding to the operation commands entered using the input device to the information reproduction apparatus via the IEEE1394 serial bus and receiving responses to the control commands from the information reproduction apparatus; and a processor for controlling the input device, the memory, and the IEEE1394 digital interface board, wherein, when an operation command is entered using the input device, the processor determines what kind of control command should be sent to the information reproduction apparatus based on the entered operation command and the status data memorized in the memory and controls the IEEE1394 digital interface board to send the control command according to the determination to the information reproduction apparatus; and wherein, when first and second operation commands are entered in succession using the input device, the processor updates the status data memorized in the memory on receipt of a response, from the information reproduction apparatus, indicating that a control command corresponding to the first operation command is normally accepted, without checking status of the information reproduction apparatus, and determines what kind of control command should be sent to the information reproduction apparatus in response to the second operation command, on entering the second operation command using the input device.

2. The controlling device according to claim 1, wherein the status data memorized in the memory is data about whether or not the information reproduction apparatus is during playback operation;

wherein, when a playback operation command is entered using the input device, the processor causes the IEEE1394 digital interface board to send a playback control command to the information reproduction apparatus and updates the status data memorized in the memory on receipt of a response, indicating that the playback control command is normally accepted, from the information reproduction apparatus via the IEEE1394 digital interface board, without checking whether or not the information reproduction apparatus is during playback operation; and wherein, when either a rewind command or a fast-forward command is entered using the input device following the entry of the playback command, the processor determines what kind of control command should be sent to the information reproduction apparatus based on the entered operation command and the status data memorized in the memory, without sending to the information reproduction apparatus a control command for inquiry about whether or not the information reproduction apparatus is during playback operation.

3. A home network comprising the controlling device and the information reproduction apparatus according to claim 1, wherein the controlling device and the information reproduction apparatus are connected via an IEEE1394 serial bus.

4. A home network comprising the controlling device and the information reproduction apparatus according to claim 2, wherein the controlling device and the information reproduction apparatus are connected via an IEEE1394 serial bus.

* * * * *